March 10, 1964

L. T. THOMASSON 3,124,707

NOISE-DISCRIMINATOR VIDEO CIRCUIT EMPLOYING TAPPED
DELAY TIME TO FORM PULSE TO BE DETECTED

Filed June 12, 1961

INVENTOR.
LELAND T. THOMASSON

BY
Reynolds & Christensen

ATTORNEYS

United States Patent Office 3,124,707
Patented Mar. 10, 1964

3,124,707
NOISE-DISCRIMINATOR VIDEO CIRCUIT EMPLOYING TAPPED DELAY TIME TO FORM PULSE TO BE DETECTED
Leland T. Thomasson, Seattle, Wash., assignor to The Boeing Company, Seattle, Wash., a corporation of Delaware
Filed June 12, 1961, Ser. No. 116,546
5 Claims. (Cl. 307—88.5)

This invention relates to detection systems which respond to video pulses above a predetermined threshold value and which for this purpose require maximum peak signal amplitude in relation to average noise level. A primary application for the invention is in pulse-type radar systems; however, the principles of the invention may be used in any system in which signal pulses of known length are to be detected in the presence of random noise. The invention is herein illustratively described by reference to the presently preferred embodiment thereof; however, it will be recognized that certain modifications and changes therein with respect to details may be made without departing from the underlying essentials involved.

Integration type systems for increasing signal-to-noise ratio are known in which the integration takes place cumulatively cycle by cycle of the recurring pulses. One example of such a system is a conventional radar employing a cathode ray tube display in which the persistence of the phosphorescent screen causes some cumulative excitation of a repeating signal image, whereas noise excitation, being of a random character, produces less of this effect. Also, cycle-to-cycle coincidence circuits, with appropriate delay networks, have been proposed to increase effective signal-to-noise ratio. All systems of this type, which operate on a cycle-to-cycle basis, are considered to be less effective than a successful system which achieves its effect within, or by operating upon each individual impulse. So-called pulse compression systems are of this general character. A difficulty with pulse-compression systems, however, lies in their relative complexity.

A broad object of this invention is to provide a pulse integration type system which operates on individual signal impulses, rather than upon a cycle-to-cycle basis, in order to enhance signal-to-noise ratio in any pulse type system in which the pulse length is predetermined or known.

More specifically it is an object hereof to achieve the foregoing result by relatively simple, inexpensive and noncritical means which will be both reliable and trouble-free in operation.

Still another object is to provide such a device wherein conventional circuit components may be used, which can easily be miniaturized and arranged in a compact package for airplane and other applications in which lightness of weight and compactness are desirable.

Still another object is to provide a simplified electronic impulse transfer circuit for enhancing signal-to-noise ratio. More specifically the device contemplated operates on rectangular video pulse envelopes without requiring changes in the wave form of the transmitted pulse energy; that is, the device is readily inserted in existing radar and other video detection circuits without requiring any changes in the wave forms or operating modes of such systems.

With the improved device an increase of 7-db in signal-to-noise ratio is theoretically achieved, which is equivalent to increasing the transmitted power of a radar by five times, or to increasing the detection range of the radar by 50% for the same transmitted power level as with a conventional system. This theoretical gain is closely approached in practical circuits of this invention meeting the foregoing objectives.

In accordance with this invention video electrical signals of predetermined duration, mixed with electrical noise, are applied to one end of a delay network having a succession of taps spaced along its length and connected to energize individual amplifiers (the term "amplifiers" includes electronic amplifiers, solid-state amplifiers, relays, switches or other transformer function devices of an equivalent nature) having a common load impedance from which the system output is derived. In the case of a rectangular video pulse signal, the delay time spacings between taps and the total delay along the network to the last tap are so designed or arranged that the output pulse from the system represents or approximates the auto-correlation function of the network for a rectangular video pulse, which is graphically represented as a triangular wave form. Optimized design of the system for this purpose in the case of a rectangular pulse would entail an infinite number of infinitesimally spaced taps along a linear network, together with an infinite number of associated amplifiers of equal gain energized by these taps and having a common load resistance so as to produce a smooth linear rise in output voltage to a peak followed immediately by a smooth linear decrease in output voltage to the original reference value. As a practical matter, however, a finite number of taps and amplifiers will serve the purpose and achieve near-optimum results. The auto-correlation and cross-correlation function theory upon which system operation is predicated is discussed at a theoretical level and in some detail in "Probability and Information Theory with Applications to Radar" by P. M. Woodward, McGraw-Hill, 1955, to which reference is hereby made for purposes of theoretical background.

These and other features, objects and advantages of the invention will become more fully evident from the following description thereof by reference to the accompanying drawings.

Figure 1:
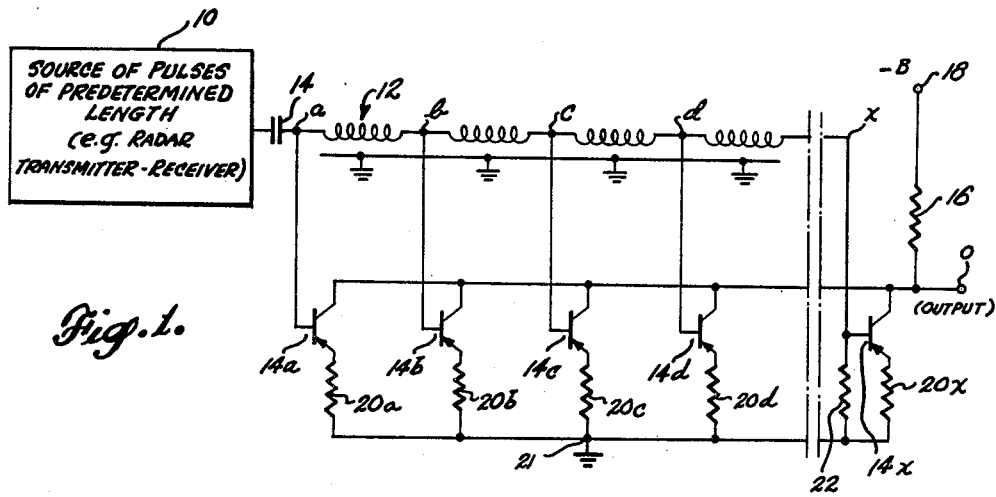
FIGURE 1 is a schematic diagram of the system in a simplified form illustrating the principles involved.

Referring to the drawings, rectangular pulses of predetermined duration are delivered by a pulse source 10 to the input terminal $a$ of a delay network 12 through a coupling condenser 14 or other coupling means, the nature of which has no special significance herein. Including its input terminal "$a$," the delay line 12 has a succession of taps $a, b, c, \ldots x$ spaced successively along its electrical length which are connected respectively to the bases of amplifier transistors 14$a$, 14$b$, 14$c$, ... 14$x$. The transistors collectors are connected through a common load resistance 16 to a voltage source at terminal 18, whereas the individual transistor emitters are connected through separate resistances 20a, 20b, 20c, . . . 20x to the opposite terminal of the source, namely, the ground terminal 21. The system output terminal O is represented by the junction between the common load resistance 16 and the interconnected transistor collectors.

The far end (i.e., the end opposite from the source 10) of the network 12 is terminated in its characteristic impedance 22 as shown. In accordance with this invention the total time delay encountered by a rectangular pulse passing down the delay line 12 is such, in relation to the pulse duration, that the leading edge of the delayed pulse as it reaches point x (i.e., the far end of the line) for application to the final transistor stage 14x is compared in point of time with the trailing edge of the directly applied pulse as it exists at point a which is the control electrode of the first-stage transistor 14a. This comparison is made by providing a total delay factor in the network 12 which is just slightly less than the duration of the applied pulse. The difference between such delay factor (measured in time) and the pulse duration is such that the net output pulse delivered at output terminal O rises to a crest or peak and remains there for a brief but finite period sufficient to produce a response in the circuit (not shown) to which the output terminal O is connected. Preferably this dwell time during which the output pulse remains at its peak is made to equal the time increment represented by the delay occurring between each of the successive tap points a, b, c, . . . x in the delay network itself; thus, in a practical design the number of equally spaced tap points a, b, c, . . . x, and thereby the number of output amplifiers 14a, 14b, 14c, . . . 14x, is made equal to the total pulse duration from source 10 divided by the section time delay increments (T).

Figure 2:
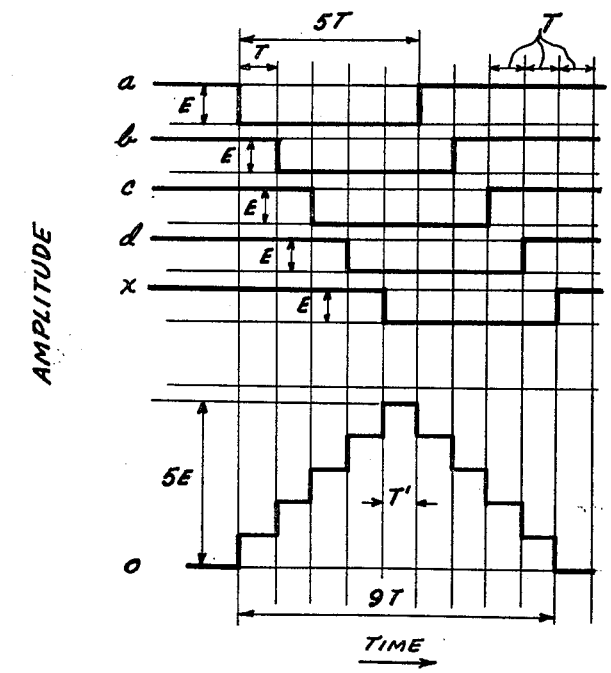
FIGURE 2 is a wave diagram depicting operation of the system.

In FIGURE 2, the graphs a, b, c, . . . x represent the rectangular pulse wave as it appears at the correspondingly designated points along the delay line 12 as a function of time. Assuming negligible attenuation in the delay line, each pulse as it appears at point x (the far end of the line) is equal in amplitude and similar in shape to the initial pulse as it is applied to the initial end of the line at point a and overlaps in time the latter pulse by a time interval equal to the delay experienced in each delay line section. The composite graph O is the output voltage wave form representing the summation of load currents produced in the common load resistance 16. It will be seen that this output wave form has a peak value theoretically equal to the initial value multiplied by the number of delay line tap points a, b, c, . . . x. This output wave form is an approximation of the auto-correlation function of the delay network (i.e., between the input wave form applied to the network and the unit impulse response characteristic of the network), as discussed in the above-cited text authority. In the example of a rectangular pulse and a linear delay network this wave form ideally should be of isosceles triangular form, when viewed in a time-base amplitude function graph. This optimum form can be approximated with a sufficient degree of accuracy for practical purposes, however, by as few as ten sections, more or less, in the delay network, or even fewer if some sacrifice in response efficiency is permissible for the sake of a smaller number of components in the system.

It is, of course, possible with the system to obtain useful results even by increasing or decreasing the output wave crest period T' above or below the optimum value T representing the individual delay-line section time increment. However, to the extent that the crest period is unduly shortened or lengthened the efficiency of the circuit suffers proportionately. In FIGURE 2 the wave diagrams correspond to a network having four sections but it will be understood, of course, that the number of steps in the output wave preceding or succeeding the crest thereof in a particular case will be equal to the number of delay network sections, plus one.

As previously mentioned, the optimum response of the system requires a reasonably close approximation of the auto-correlation function of the network for the applied pulse shape. Thus, in the example, while it is possible to employ delay network sections which have differing delay periods, or amplifiers with differing gains, so that the steps in the output wave will have differing durations, or amplitudes, nevertheless to the extent they produce a deviation from the optimized auto-correlation function of the network they impair the efficiency of the system for its intended function.

These and other aspects of the invention will be recognized by those skilled in the art on the basis of the foregoing disclosure of the presently preferred embodiment.

I claim as my invention:

1. In a noise-discrimination video pulse system, in combination with means to produce video pulses of predetermined duration to be detected amidst electrical noise, a time delay network having a succession of taps spaced apart along the electrical length of said network and dividing the network into sections, a plurality of amplifiers having control elements responsively connected to said taps respectively and having load elements, a common load impedance for said amplifiers connected in circuit with said load elements to develop an output wave form proportional to the summation of amplifier load currents, an input connected to one end of said delay network for application of said video pulses thereto, and an output terminal connected to said common load impedance for delivering said output wave form from the system, the summation of the delay periods of the respective network sections between the tap adjacent the input end of the network and the tap adjacent the opposite end of the network being not more than the duration of individual video pulses produced by said means.

2. The combination defined in claim 1, wherein the means to produce video pulses comprises a source of substantially rectangular waves, and wherein the time delay and the output voltage wave form produced by the system network comprises a subsantially linear response network having its successive taps spaced by substantially equal intervals along the electrical length of the network.

3. The combination defined in claim 1, wherein the pulses produced by said means are of substantially rectangular wave form, and the delay network sections have substantially equal delay periods individually substantially equal to the difference between the pulse duration and said summation of delay periods, whereby said output wavefore from the system on a linear time base approximates an isosceles triangle having a crest value which persists substantially for the duration of one such delay period.

4. In a noise-discriminator video pulse system, in combination with means to produce substantially rectangular video pulses of predetermined duration to be detected amidst electrical noise, a time delay network having a succession of equally spaced taps along the electrical length of said network and dividing the network into sections having substantially equal delay period increments, a plurality of amplifiers having control elements responsively connected to said taps respectively and having load elements, a common load impedance for said amplifiers connected in circuit with said load elements to develop an output wave form proportional to the summation of amplifier load currents, an input connected to one end of said delay network for application of said video pulses thereto, and an output terminal connected to said common load impedance for delivering said output wave form from the system, the total delay of the network between the endmost taps thereof being less than the duration of individual video pulses produced by said means, and differing therefrom by one of said delay period increments.

5. In a noise-discrimination video pulse system, in combination with means to produce video pulses generally of predetermined form and duration to be detected amidst random electrical signals, an electrical time-delay network having an input and having a plurality of output connections spaced along said network at respective points corresponding to successively increased time delays, adding circuit means including a common output and a plurality of inputs including individual electrical transfer means therein connected to the respective network output connections, the summation of the delays between successive network output connections being less than the duration of individual video pulses and the network being operable in association with said adding circuit means to produce in the latter's output pulses of a form substantially corresponding to the auto-correlation function of said video pulses.

References Cited in the file of this patent

UNITED STATES PATENTS

| | | |
|---|---|---|
| 2,273,163 | Wilson | Feb. 17, 1942 |
| 2,498,678 | Grieg | Feb. 28, 1950 |
| 2,551,250 | Dome | May 1, 1951 |
| 2,806,155 | Rotkin | Sept. 10, 1957 |